United States Patent [19] [11] 3,985,537
Hauschild et al. [45] Oct. 12, 1976

[54] PROCESS FOR MAKING CALCINED ALKALI PHOSPHATES OF HIGH CITRATE SOLUBILITY FOR USE AS FERTILIZERS

[75] Inventors: Ulrich Hauschild; Rudolf Holst, both of Hannover; Hans-Heinz Kaspers, Pattensen; Heinrich Rötger, Ronnenberg, all of Germany

[73] Assignee: Kali-Chemie Aktiengesellschaft, Hannover, Germany

[22] Filed: Aug. 7, 1974

[21] Appl. No.: 495,522

Related U.S. Application Data

[63] Continuation of Ser. No. 259,851, June 5, 1972, abandoned.

[30] Foreign Application Priority Data

June 5, 1971 Germany............... 2128133

[52] U.S. Cl............................ 71/34; 71/45; 71/47; 423/167
[51] Int. Cl.²........................ C05B 13/06
[58] Field of Search............ 71/33, 34, 45, 47, 46, 71/62, 64 D, 42; 423/167

[56] References Cited
UNITED STATES PATENTS

| | | | |
|---|---|---|---|
| 3,409,394 | 11/1968 | Sprigg | 71/64 D X |
| 3,552,944 | 1/1971 | Hauschild et al. | 71/33 |
| 3,713,803 | 1/1973 | Holst et al. | 71/45 |
| 3,719,464 | 3/1973 | Hauschild et al. | 71/45 |

*Primary Examiner*—Frank A. Spear, Jr.
*Assistant Examiner*—Ferris H. Lander
*Attorney, Agent, or Firm*—Michael J. Striker

[57] ABSTRACT

Calcined alkali phosphates of high citrate solubility are made by subjecting natural calcium phosphates including tricalcium phosphate to a thermal decomposition with an aqueous alkali hydroxide solution in a revolving furnace at 900° to 1300°C in the presence of silicic acid. The amounts in the starting mixture are selected to provide for one mol of $P_2O_5$ per 1.1 to 1.5 mol of $Me_2O$ (Me being an alkali metal) and an amount of silicic acid sufficient to form calcium orthosilicate by combining with 1 mol of CaO derived from the initial tricalcium phosphate and with the lime which is not part of a phosphoric acid compound. The alkali hydroxide solution is introduced at a 30 to 80% concentration directly into the revolving furnace so as to cause the solution to impinge upon the mass while the same is at a temperature of at least 400°C. Thus a rapid evaporation of the water, a speedy course of the decomposition reaction and a good homogenization due to the revolving movement of the furnace are accomplished. The decomposition is then completed in the calcination zone of the furnace.

6 Claims, 2 Drawing Figures

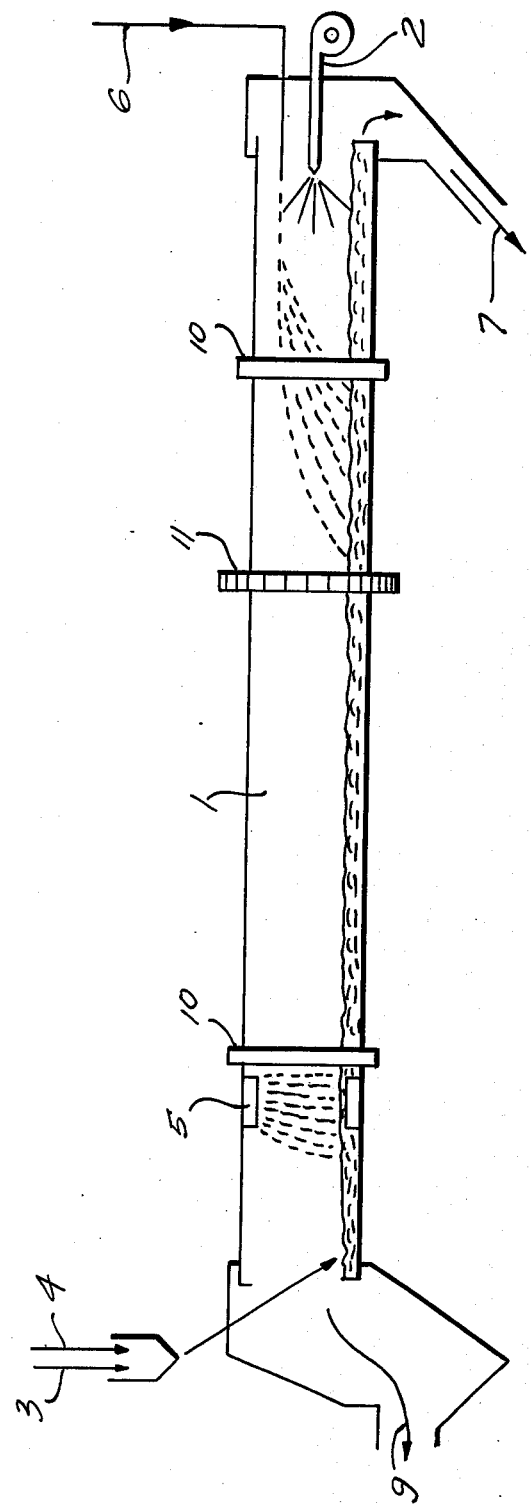

PROCESS FOR MAKING CALCINED ALKALI PHOSPHATES OF HIGH CITRATE SOLUBILITY FOR USE AS FERTILIZERS

REFERENCE TO RELATED APPLICATION

This application is a continuation of application Ser. No. 259,851, filed June 5, 1972, now abandoned.

BACKGROUND OF THE INVENTION

The basic principles for making citrate solublecalcined alkali phosphates for use as fertilizers in a revolving furnace have been disclosed in German Pat. No. 481,177. According to this disclosure a mixture of crude phosphate, alkali carbonate and silicic acid is subjected to a calcining operation at a temperature of about 1200°C. The amounts of starting components are selected to provide for at least 1 mol alkali oxide per mol $P_2O_5$ and silicic acid is present in an amount to permit formation of calcium orthosilicate by combining with 1 mol of CaO derived from the tricalcium phosphate and with lime not attached to phosphoric acid in the starting mixture. The chemical mechanism presumably is as illustrated by the following reaction:

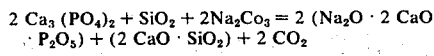

$$2\ Ca_3(PO_4)_2 + SiO_2 + 2Na_2CO_3 = 2\ (Na_2O \cdot 2\ CaO \cdot P_2O_5) + (2\ CaO \cdot SiO_2) + 2\ CO_2$$

Later investigations have shown that it is advantageous for a complete alkaline decomposition of natural calcium phosphates, briefly called herein "crude phosphates", if the mol ratio between the $P_2O_5$ present in the crude phosphate and the alkali oxide used as decomposition agent is between 1 : 1.1 and 1 : 1.5. The reaction is favored by the presence of water vapor which can be supplied using fuels rich in hydrogen, particularly oil, in order to obtain the necessary decomposition temperature. The calcined product obtained in this manner at about 1200°C is a slightly sintered, not molten porous mass. The products for this reason are known under the designation "sinter phosphates".

If calcined sodium carbonate is used a sodium-calcium silicophosphate is obtained of which the phosphoric acid content is virtually completely soluble in a 2% citric acid solution, in neutral ammonium citrate solution and particularly in an ammoniacal ammonium citrate solution which latter is also known as Petermann's solution. The fertilizer grade, that is the activity as fertilizer, of these calcined phosphates is best evaluated on the basis of the $P_2O_5$-solubility in Petermann's solution.

Although theoretically in general alkali carbonates can be used as decomposition agents, only sodium carbonate has found acceptance in industrial technique. As against postassium carbonate, sodium carbonate has the advantage that it is available at a lower price and can be handled more easily. Besides when sodium carbonate is used the calcining temperature can be increased to above 1200°C without causing the melting to start. On the other hand when potassium carbonate is used the temperature should not exceed 1150°C. Besides it is known that potassium compounds at the necessary reaction temperatures are largely volatile which causes rather high potassium losses during the comparatively long decomposition periods. Potassium containing fertilizers have therefore been made by simply adding potassium salts such as potassium chloride to the products obtained in the sodium carbonate decomposition.

There have also been repeated attempts to obtain calcined potassium phosphate directly in a calcining operation. In French Pat. No. 1,189,733 for instance it has been suggested to make calcined phosphates by calcination of crude phosphate, silicic acid and particularly potassium bicarbonate as decomposition agent at temperatures between 550° and 900°C. This, however, is only possible if the potassium bicarbonate is employed in a substantial excess compared with the usual decomposition with sodium carbonate. The thus obtained product has a comparatively high $K_2O$ content. Because of the virtually complete water solubility of $K_2O$ a strongly alkaline medium is produced when dissolved which in turn raises problems for the use as fertilizer.

In Belgian Pat. No. 605,561 an attempt has been made to make the process for producing calcined potassium phosphates more profitable by employing a starting mixture of crude phosphate and particularly potassium bicarbonate upon addition of water and granulating the mixture. However even when using the easier decomposable aluminum calcium phosphates as crude phosphates the results have not been satisfactory. In this patent it has also been proposed to employ solid potassium hydroxide as decomposition agent. This proposal however could not be carried out since such granulates cake together immediately upon introduction into the revolving furnace and stick to the furnace wall.

The German published application No. 1,925,539 has proposed the use of potassium hydroxide solutions, for instance, solutions obtained in the electrolysis of potassium chloride solutions. Accordingly, a granulate is formed from ground crude phosphate, potassium hydroxide solution and sand in conventional manner by mixing, granulating, drying and recirculating a suitable amount of the comminuted dried product. The decomposition by calcination is carried out at temperatures between 850° and 1000°C. It can easily be seen that this is not an industrially useful process because the preferred embodiment is to the effect that the calcining operation should be carried out on a moving sinter belt while adding ground coal. The sintering times according to the examples are 1 hour at 950°C.

Although the application mentions that the calcining process can also be carried out in a revolving furnace it is quite apparent that such furnace cannot be used for technical reasons since the required reaction conditions, that is the maintaining of a calcining temperature of for instance 950°C for a time in excess of 1 hour, can hardly be implemented in a revolving furnace. Therefore, when such furnace is used an incomplete decomposition must be expected. Besides, the critical point which makes the use of a revolving furnace inopportune is that, as indicated in the disclosure of the cited publication, the decomposition mixture will not withstand the mechanical processing in a revolving furnace. Tests by the present applicants have shown that this type of granulates will immediately cake together when introduced into the hot revolving furnace and will form heavy deposits on the furnace walls. The compacting of the product after a short time proceeds to the point where the furnace becomes clogged up and an interruption of the operation therefore becomes necessary.

In more recent times processes have also been proposed which permit use of concentrated aqueous alkali hydroxide solutions as decomposition agents in the making of calcined alkali phosphates in revolving furnaces. Basically these processes consist in converting the mixture of crude phosphate, sand and alkali hydroxide solution to a solid granulate or agglomerated product prior to introduction in the furnace. Such granulate or agglomerate will easier withstand the stress during passing through the furnace and, under the conditions in the revolving furnace will lead to products of high citrate-soluble $P_2O_5$ content.

A number of proposals have been made to the effect to employ for this purpose the waste gases obtained in the revolving furnace operation which contain, in addition to carbon dioxide, an inert gas, volatile compounds formed during the calcining operation and dust particles. For this purpose the aqueous alkali hydroxide solutions are treated with the furnace gases prior or after mixture with the crude phosphate and the necessary amounts of silicic acid.

For instance according to the German Pat. No. 1,266,768 the potassium hydroxide solution is converted with the off gases from the furnace into an alkali carbonate solution of such concentration that a granulate adapted for the calcining process is formed after mixing with the crude phosphate and the required amounts of sand.

According to German published application No. 1,592,690 only a partial carbonization of the alkali hydroxide solution is effected in addition to the concentration. The formation of the granulate is effected subsequently by mixing the solution with the crude phosphate and the sand while passing therethrough the off-gases from the furnace.

From Belgian Pat. No. 713,005 it appears furthermore that suitable products from liquid and up to slurry-like mixtures of alkali hydroxides, crude phosphates and sand can be obtained by spray drying or drying on a belt by means of the hot off-gases from the furnace.

In British Pat. No. 1,159,650 it has been proposed to process the initial mixtures, preferably in the presence of off-gases from the furnace, with a sufficient amount of recirculated final product to obtain a granular starting material (also in U.S. Pat. No. 3,552,944).

According to German published application No. 1,294,977 a portion of the compound which furnishes the alkali oxide is introduced into the revolving furnace in the form of a concentrated aqueous alkali hydroxide solution by direct introduction near the point of introduction of the raw materials and the remainder is then added in the form of alkali carbonate. This operation is possible by bringing the alkali hydroxide solution into contact with a crude phosphate-alkali carbonate-sand mixture. The ratios in this case will depend on the type and concentration of the alkali hydroxide solution and the properties of the crude phosphate and alkali carbonate.

It is accordingly an object of the present invention to provide for a process of the type described wherein the entire amount of alkali hydroxide furnishing compound can be introduced directly into the revolving furnace in the form of an aqueous alkali hydroxide solution.

SUMMARY OF THE INVENTION

The process for the continuous production of calcined alkali phosphates of high citrate solubility for use as fertilizers by thermal decomposition of a mixture of natural calcium phosphates including tricalcium phosphate, silicic acid, and aqueous alkali hydroxide solution in a directly heated industrial revolving furnace at a temperature of about 900° to 1300° C, the said decomposition being effected with a starting mixture wherein for one mol of $P_2O_5$ 1.1 to 1.5 mol of $Me_2O$, Me being alkali metal, are present and wherein the amount of silicic acid is sufficient to form calcium orthosilicate by combining with a mol of CaO derived from the initial tricalcium phosphate and with the lime which is not part of a phosphoric acid compound is comprising introducing the aqueous alkali hydroxide solution at a strength of 30 to 80 percent by weight concentration directly into the revolving furnace so as to cause the solution to impinge upon the mass of calcium phosphates and silicic acid while the said mass is at a temperature of at least 400°C, whereby a rapid vaporization of the water, a speedy course of the decomposition reaction and a good homogenization due to the revolving movement of the furnace are accomplished; and following this step, by completing the decomposition in the calcination zone of the furnace.

BRIEF DESCRIPTION OF THE DRAWINGS

The drawing, in a purely diagrammatic manner, illustrates the manner of introduction of the raw materials in a revolving furnace as practiced in the process of the invention.

DETAILS OF THE INVENTION AND SPECIFIC EMBODIMENTS

In carrying out the process of the invention it is important to observe the following points. The temperature of the crude phosphate mixture, must be high enough to permit an immediate reaction of the alkali hydroxide solution with the mixture to take place. The exact temperature is difficult to determine in an operating revolving furnace since only approximate temperature measurements can be made. It has however been found that the temperature of the crude phosphate-sand mixture which is contacted with the major portion of the alkali hydroxide solution should preferably have a temperature between 600° and 900°C. It is in this temperature zone that the conditions are met for a rapid evaporation of the water and a speedy reaction of the several components. If the major portion of the alkali hydroxide comes in contact with a mixture heated to a substantially higher temperature the travel length up to the discharge outlet of the calcined product from the revolving furnace may not be sufficient to permit a complete homogenization and a high degree of decomposition. In case of the use of a sodium hydroxide solution the preferred temperature is more in the upper portion of the stated range while for the potassium hydroxide solution the lower temperature portion may be more favorable.

Important is also that the alkali hydroxide solution does not impinge on a too narrow zone of the mass in the furnace. It should, for instance, not make initial contact across less than 0.5 m in longitudinal direction of the furnace since otherwise the crude mixture may stick to the furnace wall. The length of the immediate contact area depends upon a number of factors, such as the temperature of the introduction zone, the type of furnace, the amount of vaporized water, which in turn is dependent on the concentration of the alkali hydroxide solution and the kind of alkali hydroxide, etc. In short, the zone of impact must be such as to assure a rapid evaporation of the water in order to avoid all deposit formation.

The alkali hydroxide solution is preferably introduced, particularly in case of large industrial furnaces, from the burner side and in a direction counter to the incoming mixture of crude phosphate and sand. The manner of applying the liquid composition to the mass to be decomposed may be selected as desired. It is only necessary that there is an adequate distribution of the solution.

With reference to the drawing which illustrates the manner of introduction of the raw material, 1 is a revolving furnace heated by an oil burner 2. At 3, crude phosphate and at 4 sand are introduced in a continuous process. Because of the revolving movement of the furnace the mixture will be caused to flow towards the combustion gases and will thus increasingly become heated-up. A dust screen formed by installation 5 causes the off-gases to make intimate contact with the compartively cold raw material. Thus, a separation or depositing of the fines takes place during the heat exchange.

Further down in the furnace, preceding the decomposition zone proper, the hot solid mass present in the furnace enters into reaction with the continuously introduced aqueous alkali hydroxide solution. This is accomplished for instance for contacting the solids with the solution entering through one or several feed ducts 6 simultaneously across an area which is several meters long.

The product then passes through a sinter zone and thereafter enters a cooling device 7. The flue gas is emitted at 9 from the system after passing a dust separator. 10 indicates the bearings of the furnace and 11 is the drive pinion.

The concentration of the introduced alkali hydroxide solution is of significance only insofar as the energy produced in the furnace must be sufficient to cause quick vaporization of the added water. Preferred are alkali hydroxide concentrations between 40 and 60% by weight. Solutions of higher concentration should be used only in special cases.

The aqueous alkali hydroxide solutions are preferably introduced in a direction concurrent with the fuel gases and according to a preferred embodiment are brought into contact with the crude phosphate-sand mixture shortly prior to or at the beginning of the calcination zone proper. There is therefore compartively little time up to discharge of the material from the furnace, intermixing of the materials and taking place of the calcination reaction itself.

It has been found that the products obtained thus will have a uniform composition and the $P_2O_5$ will almost 100% be soluble in Petermann's solution. This is all surprising as it is well known that alkali hydroxides at temperatures used in the process of the present invention, particularly in a gas current, are highly volatile. If nevertheless a high $P_2O_5$ decomposition degree of the crude phosphate is obtained the reason can only be that the alkali hydroxide when coming into contact with the raw material mixture is immediately subject to fixation by conversion into another non-volatile chemical form.

Sodium or potassium hydroxide solutions or mixtures thereof can be used as decomposition agents in any desired ratio. In the following examples, Kola Peninsula apatite and phosphate rock pebbles are used as the crude phosphates. However, other naturally occurring calcium phosphates could be decomposed in the same manner, for instance North African crude phosphates. Depending on the type of crude phosphate and the decomposition agent the calcined phosphate obtained will have a composition within the values appearing from the following table:

| | Decomposition with NaOH solution | Decomposition with KOH solution |
|---|---|---|
| $P_2O_5$, % | 27 – 31 | 24 – 28 |
| CaO, % | 36 – 40 | 34 – 38 |
| $Na_2O$, % | 15 – 18 | |
| $K_2O$, % | | 21 – 25 |
| $SiO_2$, % | 7 – 10 | 6 – 9 |
| $P_2O_5$-Petermann solubility, % | < 98 | <98 |

The process of the invention has the advantage that the entire amount of alkaline decomposition agent can be used in form of an alkali hydroxide solution, such as for instance is obtained by in the electrolysis of alkali chloride solutions. Thus, no additional use of apparatus or energy is necessary.

By suitable introduction of the individual reaction components into the revolving furnace it is thus possible to make potassium containing fertilizer directly and in an economical manner. Calcined potassium phosphates can be obtained which have nutrient contents, calculated as $P_2O_5$ and $K_2O$, up to about 50%.

The nutrients in addition are available to the plant during an extended period of time. The reason is that only a small fraction of the $K_2O$ content is present in water soluble form. The major part of it goes into solution only with the distribution of the citrate-soluble $P_2O_5$ in the soil or in the plant. As distinguished from fertilizers manufactured by the usual mixing operations which usually require the addition of water soluble potassium chloride the fertilizers of the invention can be used without potassium loss through leaching. The high CaO contents present in these fertilizers in a basically effective form is particularly desirable with soils which are deficient in lime.

The following examples will further illustrate the invention.

EXAMPLE 1

A mixture of crude phosphate and sand was introduced in a directly heated industrial revolving furnace from the side opposite the burner. The mixture comprised 106 parts by weight of sand (98% $SiO_2$ content) for each 1,000 weight parts of Kola Peninsula apatite with a content of 39.1% $P_2O_5$. Counter to this mixture a 48.7% by weight aqueous sodium hydroxide solution was introduced into the furnace in a continuous operation from the side of the burner. The introduction was effected in a manner that the dry surface was contacted across a length of about 6 to 8 m and in a temperature area of the dry mass between about 750° and 900° C. The amount of sodium hydroxide solution was 610 weight parts relative to 1,000 weight parts of apatite. No deposits on the furnace wall occurred.

In passing through the decomposition zone proper the reaction mass was then heated to a maximum of 1,250° C which did not cause any difficulties during the entire passage through the furnace. The fines contained in the off gases were collected in a conventional separator and were reintroduced into the raw material mixture at the furnace inlet in a continuous operation.

The calcined phosphate obtained had good grinding properties. It contained 29.7% $P_2O_5$ and 17.5% $Na_2O$. The $P_2O_5$ was soluble at 98.5% in Petermann solution.

EXAMPLE 2

A mixture of Kola Peninsula apatite and sand (98% $SiO_2$) with a weight ratio of crude phosphate to sand of 1:0.106 was continuously introduced into a directly heated industrial revolving furnace. From the side of the burner there was introduced, counter to the phosphate and sand mass and while the same was at a temperature between about 600° and 750° C, a 47.5 weight percent potassium hydroxide solution. The amount of the solution provided a weight ratio of apatite to potassium hydroxide of 1:0.86. The product was then calcined at a maximum temperature of 1140° C. The operation took place without any difficulties.

The calcined potassium phosphate obtained had good grinding properties. It contained 27.15% $P_2O_5$ and 23.8 $K_2O$. The $P_2O_5$ solubility in a 2% citric acid solution was 99.2%. In the Petermann solution the solubility was 98.4%. Of the total $K_2O$, 16% were soluble after 1 hour in water at 20° C.

EXAMPLE 3

A mixture of Florida phosphate rock, pebbles (34.4% $P_2O_5$) and sand (98% $SiO_2$) with a weight ratio of crude phosphate to sand of 1:0.069 was continuously introduced into a revolving furnace in the same manner as described in Example 2. The potassium hydroxide solution in a concentration of 47.5% by weight was applied to the hot mass heated to a temperature between 600° and 750° C. The weight ratio obtained was crude phosphate to potassium solution of 1:0.79. Again, no interference with the smooth course of the operation occurred.

In the cooled and ground calcined phosphate there were found to be present 25.7% $P_2O_5$ and 23.7% $K_2O$. The $P_2O_5$ solubility in Petermann's solution was 98.8%. In a citric acid solution the solubility was 99.3%.

With further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a process for the continuous production of a fertilizer containing a calcium alkali-metal phosphate that has a high solubility in Petermann ammoniacal ammonium citrate solution from a naturally occurring calcium phosphate containing tricalcium phosphate by thermal decomposition of a mixture consisting essentially of the naturally occurring calcium phosphate, silica acid and an alkali-metal hydroxide of the group consisting of sodium hydroxide and potassium hydroxide at a temperature between approximately 900° and 1300°C in a rotary furnace that is heated by means of a direct flame burner in the region of its discharge outlet, the improvement which comprises a. continuously charging a mixture of solids consisting essentially of silicic acid and a naturally occurring calcium phosphate into the rotary furnace at its inlet,
   b. passing the said mixture of solids through the furnace from its inlet to its discharge outlet at such a rate that at least a substantial portion thereof is converted into the desired fertilizer containing a calcium alkali-metal phosphate,
   c. passing the flue gases from the burner to the furnace countercurrently to the flow of the mixture of solids therethrough,
   d. maintaining the temperature of the solids within the furnace at gradually increasing temperatures from the inlet of the furnace to a maximum temperature between 900° and 1300°C at the discharge outlet of the furnace by means of the burner and the flue gases passing through the furnace,
   e. continuously charging the alkali-metal hydroxide in the form of an aqueous solution containing between 30 and 80% by weight of the alkali-metal hydroxide into the region of the furnace at which calcination of the mixture has started, or into an immediately preceding region in which the mixture of solids has reached temperature of at least 400°C, and in such manner that the water in the solution is rapidly vaporized an the mixture is homogenized by the rotary motion of the furnace, the said alkali-metal hyroxide solution being charged at a rate such that at least 1.1 and at most 1.5 mols of alkali-metal oxide (calculated as $Me_2O$ in which Me represents Na or K) is supplied for each mol of phosphorus pentoxide ($P_2O_5$) that is present in the mixture of solids that is being charged into the furnace,
   f. maintaining the concentration of the silicic acid ($SiO_2$) in the mixture of solids at such a level that substantially all of the tricalcium phosphate that is present in the mixture is converted to a calcium orthosilicate (2 CaO · $SiO_2$) and calcium alkali-metal phosphate ($Me_2O$ · 2 CaO · $P_2O_5$) in accordance with the following equation:

$$2\ Ca_3(PO_4)_2 + SiO_2 + 4\ MeOH \rightarrow 2(Me_2O \cdot 2CaO \cdot P_2O_5) + (2CaO \cdot SiO_2) + 2H_2O$$

and other phosphate-free calcium compounds that are present in the mixture of solids are converted to calcium orthosilicate in accordance with the following equation:

$$2CaO + SiO_2 \rightarrow (2CaO \cdot SiO_2)$$

g. and recovering the resulting mixture of solids containing the calcium alkali-metal phosphate at the discharge outlet of the furnace.

2. A process as defined in claim 1 in which the aqueous solution of the alkali-metal hydroxide is charged into the furnace at a region in the furnace at which calcination has started and the mixture of solids has attained a temperature between 600° and 900°C.

3. A process as defined in claim 1 in which the aqueous solution of the alkali-metal hydroxide is charged into the furnace in the form of a spray in a direction countercurrent to the direction of flow of the mixture of solids through the furnace.

4. A process as defined in claim 1 in which the aqueous solution of the alkali-metal hydroxide that is charged into the furnace impinges upon the mixture of solids passing therethrough across a zone having a length of at least 0.5 meter.

5. A process as defined in claim 1 in which the aqueous solution of the alkali-metal hydroxide contains between 40 an 60% by weight of the alkali-metal hydroxide.

6. A process as defined in claim 1 in which the alkali-metal hydroxide is sodium hydroxide or potassium hydroxide or a mixture of both.

* * * * *